United States Patent
Deets et al.

(10) Patent No.: US 7,129,318 B2
(45) Date of Patent: Oct. 31, 2006

(54) RTM AND RI PROCESSABLE POLYIMIDE RESINS

(75) Inventors: Gary L. Deets, Coventry, CT (US); Jianming Xiong, North Brunswick, NJ (US)

(73) Assignee: I.S.T. (MA) Corporation, Indian Orchard, MA (US)

( * ) Notice: Subject to any disclaimer, the term of this patent is extended or adjusted under 35 U.S.C. 154(b) by 0 days.

(21) Appl. No.: 10/931,070

(22) Filed: Aug. 30, 2004

(65) Prior Publication Data

US 2005/0080229 A1    Apr. 14, 2005

Related U.S. Application Data (60) Provisional application No. 60/499,849, filed on Sep. 2, 2003.

(51) Int. Cl.
C08G 73/12 (2006.01)
C08G 69/26 (2006.01)
B32B 27/00 (2006.01)

(52) U.S. Cl. ............ 528/353; 528/125; 528/126; 528/128; 528/171; 528/172; 528/173; 528/176; 528/179; 528/183; 528/185; 528/188; 528/220; 528/229; 528/350; 428/411.1; 428/473.5; 525/420; 525/422; 524/606; 524/600

(58) Field of Classification Search ............ 528/353, 528/125–126, 128, 170, 171, 172, 173, 176, 528/179, 183, 185, 188, 220, 229, 350; 525/420, 525/422, 423; 524/600, 606; 428/411.1, 428/473.5
See application file for complete search history.

(56) References Cited

U.S. PATENT DOCUMENTS

| | | | |
|---|---|---|---|
| 4,389,504 A | 6/1983 | St. Clair et al. | |
| 4,837,300 A * | 6/1989 | St. Clair et al. | 528/353 |
| 4,861,882 A | 8/1989 | Hergenrother et al. | |
| 5,138,028 A * | 8/1992 | Paul et al. | 528/353 |
| 5,145,943 A | 9/1992 | Li et al. | |
| 5,338,827 A | 8/1994 | Serafini et al. | |
| 5,344,982 A | 9/1994 | Hergenrother et al. | |
| 5,412,066 A | 5/1995 | Hergenrother et al. | |
| 5,567,800 A | 10/1996 | Hergenrother et al. | |
| 5,606,014 A | 2/1997 | Connell et al. | |
| 5,760,168 A | 6/1998 | Hergenrother et al. | |
| 5,817,744 A | 10/1998 | Sheppard et al. | |
| 5,952,453 A | 9/1999 | McGrail et al. | |
| 5,955,566 A * | 9/1999 | Lee et al. | 528/310 |
| 5,965,687 A | 10/1999 | Jensen | |
| 6,068,932 A | 5/2000 | Sakamoto et al. | |
| 6,114,494 A * | 9/2000 | Kifer et al. | 528/353 |
| 6,124,035 A | 9/2000 | Connell et al. | |
| 6,133,330 A | 10/2000 | Weiser et al. | |
| 6,180,746 B1 | 1/2001 | Weiser et al. | |
| 6,235,803 B1 | 5/2001 | Weiser et al. | |
| 6,359,107 B1 * | 3/2002 | Connell et al. | 528/353 |
| 6,410,127 B1 | 6/2002 | Kamae et al. | |
| 6,444,783 B1 | 9/2002 | Dodd et al. | |
| 6,468,659 B1 | 10/2002 | Vohwinkel et al. | |
| 6,476,182 B1 | 11/2002 | Auman et al. | |
| 6,511,789 B1 | 1/2003 | Naiini et al. | |
| 6,514,370 B1 | 2/2003 | Belvin et al. | |
| 6,528,145 B1 | 3/2003 | Berger et al. | |
| 6,538,097 B1 | 3/2003 | Yamaguchi et al. | |
| 2005/0014925 A1 | 1/2005 | Yokota et al. | |

FOREIGN PATENT DOCUMENTS

| | | |
|---|---|---|
| DE | 42 32 523 A1 | 3/1994 |
| JP | 64(1989)-054030 A | 3/1989 |

OTHER PUBLICATIONS

Bender, Timothy P., et al., "Poly(aryl ether)s Containing o-Terphenyl Subunits. III. Random Copoly(ether imide)s", Journal of Polymer Science: Part A: Polymer Chemistry, 2000, pp. 758-763, vol. 38.

Criss, Jim M. et al., "Resin Transfer Molding and Resin Infusion Fabrication of High Temperature Composites", Proceedings of the 46th International SAMPE Symposium, 2001, pp. 1-26, vol. 46.

* cited by examiner

*Primary Examiner*—P. Hampton Hightower
(74) *Attorney, Agent, or Firm*—Holland & Bonzagni, P.C.; Mary R. Bonzagni, Esq.

(57) ABSTRACT

Polyimide resins that are suitable for processing by resin transfer molding (RTM) and resin infusion (RI) methods at reduced processing temperatures are provided. The inventive RTM and RI processable polyimide resins exhibit melting at temperatures of less than about 200° C. and melt viscosities at 200° C. of less than about 3000 centipoise. A process for synthesizing the inventive resins is also provided, as is a fiber-reinforced composite material. The fiber-reinforced composite material employs the inventive polyimide resin as its resin matrix and demonstrates good heat resistance and mechanical properties.

31 Claims, 1 Drawing Sheet

FIG. 1

RTM AND RI PROCESSABLE POLYIMIDE RESINS

RELATED APPLICATION

This application claims priority from U.S. Provisional Patent Application Ser. No. 60/499,849, filed Sep. 2, 2003.

TECHNICAL FIELD

The present invention relates to polyimide resins having a unique combination of properties rendering them processable by resin transfer molding (RTM) and resin infusion (RI) methods at reduced processing temperatures, and to fiber-reinforced composite materials obtained therefrom. The present invention also relates to a process for synthesizing the RTM and RI processable polyimide resins.

BACKGROUND ART

Fiber-reinforced composite materials, which are made up of reinforcing fibers and matrix resins, are lightweight and have excellent mechanical properties. As such, these composite materials have been widely used in a variety of structural and non-structural applications such as aerospace, automotive, infra-structure repair, marine, military, and sporting goods or other consumer products that must have sufficient toughness and impact resistance to endure many years of harsh service.

Various methods or techniques such as prepreg, hand lay-up, filament winding, pull-trusion, RTM and RI, have been used to produce fiber-reinforced composite materials. Of these methods or techniques, the RTM method, in which a preform made up of reinforcing fibers is placed in a mold, a resin poured therein to impregnate the preform, and the impregnated preform cured to produce a molded product, offers the advantage that a large component having a complicated shape can be molded in a short period of time.

Epoxy resins, and to a lesser extent, unsaturated polyester resins, vinyl ester resins, phenol resins, and polyimide resins, have been employed as matrix resins in fiber-reinforced composite materials. The use of composite materials having polyimide resin matrices is increasing, however, where these materials are now recognized as preferred structural materials in aerospace applications, because of their lightweight and load-bearing characteristics and their oxidative stability at elevated temperatures.

Fiber-reinforced composite materials that use polyimide resins as the matrix resin are generally prepared using prepreg methods. Current technologies for making prepreg and composites from polyimides utilize solutions from the poly(amide) acids of these resins. Poly(amide) acid solutions are processed into prepreg with various reinforcing fibers. These poly(amide) acid solutions are of low solids contents and high viscosity. Therefore, the processing of these types of solutions requires overcoming significant problems such as solvent management and good fiber wet out from the high viscosity solutions. The resultant prepreg typically requires residual solvent contents of 20 to 25% by weight (approximately 2–3% water from thermal imidization reaction) for adequate tack and drape. This residual solvent must then be removed during the composite cure cycle. This material is hand-laid into composites which makes working with this type of material very labor intensive and costly.

The drawbacks inherent in prepreg methods have prompted the development of polyimide resins suitable for processing by RTM and RI methods. The developed resins, however, require relatively high processing and cure temperatures of greater than 250° C., which severely limits their industrial utility due to the need for employing specialized high temperature molding equipment.

For example, Jim M. Criss et al., *Resin Transfer Molding and Resin Infusion Fabrication of High Temperature Composites*, Proceedings of the 46th International SAMPE Symposium, Vol. 46 (2001), discloses two phenylethynyl containing imide oligomers that are processable by RTM and RI methods. The two oligomers, which are designated PETI-RTM and RFI, reportedly display low and stable melt viscosities at temperatures of 250 to 290° C. PETI-RTM is defined as BPDA//25 mole % 3,4'-ODA/75 mole % APB//PEPA, having a $M_n$=750 g/mole, while PETI-RFI is defined as BPDA//25 mole % 3,4'-ODA/75 mole % APB//PEPA, having a $M_n$=1250 g/mole. Composites are prepared by RTM using the PETI-RTM and PETI-RFI oligomers and by RI using the PETI-RFI oligomer, at processing temperatures of greater than 250° C. The injection temperature used was in the range of 260 to 288° C., while the cure temperature was 371° C.

U.S. Pat. No. 5,965,687 to Brian J. Jensen discloses mixtures of polymeric materials consisting of branched, star-shaped and linear polyimides, which are synthesized by using a small yet critical amount of a trifunctional monomer (e.g., a slow-reacting triamine such as triamino pyrimidine or melamine), along with the conventional difunctional monomers in the polymerization. These mixtures reportedly have lower melt viscosities than linear polymers at the same molecular weight thereby allowing for processing via RTM or RFI at lower pressures and temperatures with techniques such as autoclave processing. See Col. 2, lines 51 to 55, of U.S. Pat. No. 5,965,687. Processing temperatures of greater than 250° C. are still required, however, thereby limiting the industrial utility of these mixtures.

U.S. Pat. No. 6,124,035 to Connell et al. discloses high temperature transfer molding resins prepared from aromatic diamines containing phenylethynyl groups and various ratios of phthalic anhydride (PA) and 4-phenylethynyl phthalic anhydride (PEPA). These resins reportedly have, among other things, relatively low melting temperatures (~182° C.), low melt viscosities (<1 poise at ~270° C.), and excellent melt stabilities (>2 hours at 250~280° C.). As noted above, however, the relatively high temperatures that are required to process these resins severely limit their industrial utility.

A need therefore exists for a polyimide resin for use as a matrix resin in a fiber-reinforced composite that possesses properties rendering it suitable for processing by RTM and RI methods at reduced processing temperatures.

It is therefore a primary object of the present invention to provide such a resin.

More particularly, it is an object of the present invention to provide polyimide resins that may be processed at reduced processing temperatures, and that exhibit melting at temperatures of less than about 200° C. and melt viscosities at 200° C. of less than about 3000 centipoise.

It is another object of the present invention to provide a process for synthesizing such RTM and RI processable polyimide resins.

It is a further object to provide a fiber-reinforced composite material that employs such a polyimide resin as the matrix resin and that has good heat resistance and mechanical properties.

SUMMARY OF THE INVENTION

The present invention therefore provides polyimide resins that are suitable for processing by resin transfer molding and resin infusion methods at reduced processing temperatures, wherein the resins exhibit melting at temperatures of less than about 200° C. and melt viscosities at 200° C. of less than about 3000 centipoise.

The present invention also provides a method for the production of the above-identified polyimide resins, wherein the method comprises:
(a) chemically combining:
   i. one or more aromatic dianhydrides represented by the following formula (I)

(I)

or by the following general formula (II)

(II)

wherein, Z represents —CO—, —O—, —SO$_2$—, or a direct bond,
   ii. one or more aromatic diamines selected from the group of 3,4'-oxydianiline, m-phenylenediamine, 2,2'-bis[4-(4-aminophenoxy)phenyl]propane, bis[4-(3-aminophenoxy)phenyl]sulfone, 1,3-bis(3-aminophenoxy)benzene, and 1,3-bis(4-aminophenoxy)benzene,
      wherein, the aromatic diamine(s) may optionally be used in combination with one or more rubber components, and
   iii. one or more carbocyclic monomeric anhydride end-capping agents selected from the group of nadic anhydride, alkyl derivatives of maleic anhydride, and 2-octen-1-ylsuccinic anhydride, and
(b) imidizing the chemical combination.

The present invention further provides polyimide resins that are produced in accordance with the method described above.

The present invention also provides a high temperature composite comprising reinforcing fibers embedded in a polyimide resin matrix, wherein the polyimide resin is suitable for processing by resin transfer molding and resin infusion methods at reduced processing temperatures, and wherein the resin exhibits melting at temperatures of less than about 200° C. and a melt viscosity at 200° C. of less than about 3000 centipoise.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawing labeled FIG. 1, which is a schematic of the method of chemically combining 3,3',4,4'-biphenyltetracarboxylic dianhydride (BPDA) and 2,2'-bis[4-(4-aminophenoxy)phenyl]propane (BAPP) monomers and a citraconic anhydride (CA) endcapping agent, and imidizing the resulting chemical combination to form a BPDA//BAPP//CA polyimide resin.

BEST MODE FOR CARRYING OUT THE INVENTION

The polyimide resins of the present invention are the reaction products of one or more aromatic dianhydrides, one or more aromatic diamines, and one or more endcapping agents. The inventive polyimide resins have a unique combination of properties, rendering them suitable for processing by RTM and RI methods at reduced processing temperatures of less than about 200° C. The inventive resins exhibit melting at temperatures of less than about 200° C. and melt viscosities at 200° C. of less than about 3000 centipose (cps).

The term "melting point," as used herein, is intended to mean the lowest temperature at which the molten polyimide resins of the present invention start to exhibit a stable melt viscosity. The term "stable" means a melt viscosity fluctuation that does not exceed 100 cps over a period of at least one hour. Melting points were determined using a TA Instruments, Model AR 1000, rheometer with measurements made in parallel mode (25 millimeter (mm) diameter, 25 mm gap) and a strain of 1.0%. The temperature was scanned over a predetermined temperature scan rate of 10° C./minute, with data recordings made every 3 seconds for a period of 37 minutes.

One aspect of the present invention involves the proper selection of the monomers used to prepare the polyimide resins. Aromatic dianhydrides deemed suitable for use in preparing the inventive RTM and RI processable polyimide resins are dianhydrides that generally have more than one aromatic ring in the structure, such as those dianhydrides represented by the following formula (I)

(I)

or by the following general formula (II)

where Z represents —CO—, —O—, —SO$_2$—, or a direct bond. The aromatic dianhydride having the structure (I) is 1,2,4,5-benzenetetracarboxylic dianhydride (pyromellitic dianhydride or PMDA), while aromatic dianhydrides having the structure (II) include 3,3',4,4'-biphenyltetracarboxylic dianhydride (BPDA), 1,1',2,2'-benzophenone tetracarboxylic dianhydride (BTDA), 4,4'-oxydiphthalic anhydride (OPDA), and 3,3',4,4'-diphenylsulfone tetracarboxylic diandydride (DSDA).

One or more dianhydrides are used to prepare the inventive polyimide resins. When two dianhydrides are used, the first dianhydride (e.g., BTDA) is preferably present in an amount ranging from about 5 to about 40% by wt. (more preferably, from about 10 to about 25% by wt., and most preferably, from about 20 to about 25% by wt.), based on the total weight of the dianhydrides, while the second dianhydride (e.g., BPDA) is preferably present in an amount ranging from about 95 to about 60% by wt. (more preferably, from about 90 to about 75% by wt., most preferably, from about 80 to about 75% by wt.), based on the total weight of the dianhydrides.

Aromatic diamines deemed suitable for use in the present invention are diamines that generally have at least one ether linkage in the structure, such as 3,4'-oxydianiline (3,4'-ODA), m-phenylenediamine (m-PDA), 2,2'-bis[4-(4-aminophenoxy)phenyl]propane (BAPP), bis[4-(3-aminophenoxy)phenyl]sulfone (BAPS-M), 1,3-bis(3-aminophenoxy)benzene (APB), and 1,3-bis(4-aminophenoxy)benzene (TPE-R).

One or more diamines are used to prepare the inventive polyimide resins. When two diamines are used, it is preferred that at least one diamine have one or more oxygen linkages and that this diamine be present in an amount of at least about 50% by wt., based on the total weight of the diamines.

In select embodiments, the aromatic diamine(s) is used in combination with a rubber component. Suitable rubber components include, but are not limited to, amine terminated rubbers. In a preferred embodiment, an amine-terminated silicone rubber (SR) is used to prepare the inventive resins. In this preferred embodiment, the rubber is present in an amount of less than about 30% by wt., and more preferably in an amount of less than about 20% by wt., based on the total weight of the aromatic diamine(s) and rubber component.

End-capping agents, suitable for use in preparing the inventive polyimide resins, are unsaturated carbocyclic monomeric anhydrides that form oligomers that exhibit melting at temperatures of less than about 250° C., and have melt viscosities at 200° C. ranging from about 500 to about 3000 cps. Examples of such monomeric anhydrides include nadic anhydride (5-norbornene-2,3-dicarboxylic anhydride), alkyl derivatives of maleic anhydride, namely—methyl maleic anhydride (citraconic anhydride) and dimethyl maleic anhydride, and 2-octen-1-ylsuccinic anhydride.

The polyimide resins of the present invention are synthesized by first preparing an amic acid solution followed by the preparation of an imide powder.

The preparation of an amic acid solution, in accordance with the teachings of the present invention, basically comprises:

(1) charging at least one dianhydride (e.g., BPDA) and at least one diamine (e.g., BAPP) to separate reaction vessels;

(2) adding quantities of a suitable solvent (e.g., 1-methyl-2-pyrrolidinone (NMP)) to each reaction vessel to form a slurry or solution of dianhydride(s) in one vessel, and a slurry or solution of diamine(s) in the other vessel, (3) heating the slurry or solution contained in each reaction vessel to a temperature ranging from about 50 to about 120° C. to dissolve the dianhydride(s) and the diamine(s);

(4) cooling the solutions contained in each reaction vessel to ambient or room temperature;

(5) slowly adding the dianhydride solution to the diamine solution over a period of time ranging from about 10 to about 60 minutes;

(6) adding a solution of end-capping agent (e.g., methyl maleic anhydride or citraconic anhydride (CA) in NMP) to the reaction vessel; and (7) stirring the solution for a period of time ranging from about 15 to about 120 minutes to form an amic acid solution, wherein, the molar ratio of dianhydride(s) to diamine(s) to end-capping agent in the amic acid solution ranges from about 1.0/1.95/2.10 to about 1.0/2.1/2.0.

By way of the present invention, it has been discovered that by slowly adding the dissolved dianhydride reactant to the dissolved diamine reactant, while controlling the reaction temperature, the molecular weight of the resulting resin is reduced causing an advantageous reduction in its melting point and melt viscosity.

Solvents suitable for use in the present inventive method include amide-based solvents such as NMP, N,N-dimethylacetamide, N,N-demethylformamide and N-methylcaprolactam, among which NMP and N,N-dimethylacetamide are preferred.

The molar ratio of dianhydride to diamine to end-capping agent is such that stirring the solution forms low molecular weight prepolymers having at least one end cap radical and suitable for chain extension and crosslinking to form polyimides that have a melting point of less than about 200° C., and a melt viscosity at 200° C. of less than about 3000 cps. Typically the prepolymers have a weight average molecular weight of less than about 4000 grams per mole (g/mol), and generally less than about 3000 g/mol.

In a preferred embodiment, the molar ratio of dianhydride(s):diamine(s):end-capping agent(s) is 1.0/2.0/2.01, and more preferably the molar ratio is n/n+1/2.

The synthesis of an imide powder, in accordance with the teachings of the present invention, involves either chemical or thermal imidization. In a preferred embodiment, the imide powder is prepared via chemical imidization in which a strong acid and an azeotropic agent are used to promote ring closure and to remove azeotropic water, respectively. In yet a more preferred embodiment, a strong acid such as methane sulfonic acid is employed as a catalyst and azeotropic water removed by use of a tertiary amine co-solvent such as toluene. More specifically, the imide powder is prepared by:

(1) placing from about 20 to about 40% by wt. (preferably from about 25 to about 35% by wt.) of the amic acid solution and from about 80 to about 60% by wt.

(preferably from about 75 to about 65% by wt.) of an azeotropic agent (e.g., toluene) in a reaction vessel;

(2) charging from about 0.05 to about 0.5% by wt. (preferably from about 0.1 to about 0.2% by wt.) of a strong acid catalyst (e.g., methane sulfonic acid) to the reaction vessel to form a mixture;

(3) heating the mixture in the reaction vessel to a temperature of from about 100 to about 130° C. (preferably, from about 120 to about 125° C.) for from about 2 to about 6 hours;

(4) cooling the mixture to ambient or room temperature;

(5) removing the azeotropic agent from the reaction vessel; and (6) isolating and recovering the solids or imide powder from the remaining solution contained in the reaction vessel.

By way of the present invention, it has been further discovered that the strong acid and the azeotropic agent, when used in the amounts noted above, serve to effectively control ring closure temperature. More specifically, the strong acid causes more water to be generated, while the azeotropic agent decreases the reflux point of the system.

Figure 1:
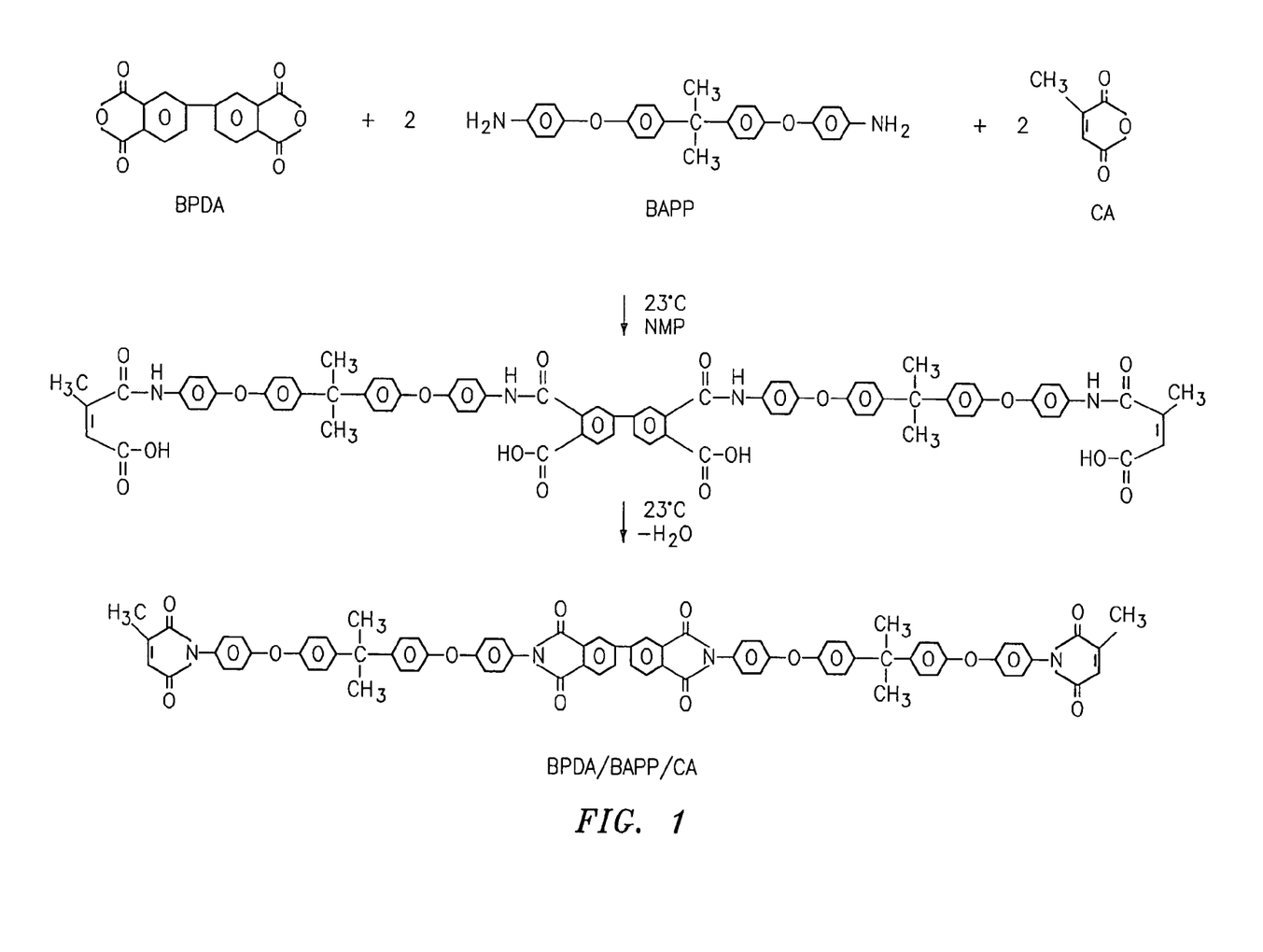

A schematic of the synthesis of one polyimide resin contemplated by the present invention, namely—BPDA//BAPP//CA, is shown in FIG. 1.

The polyimide resins of the present invention exhibit melting at temperatures of less than about 200° C. (preferably from about 150 to about 175° C.) and low melt viscosities at 200° C. of less than about 3000 cps (preferably from about 1000 to about 2000 cps). As such, these resins may be processed at these reduced temperatures. Moreover, the inventive resins have a processing window (time at minimum melt viscosities) at 200° C. of at least about 60 minutes and cure at temperatures ranging from about 325 to about 375° C., preferably from about 330 to about 350° C. The weight average molecular weight of the inventive resins is less than about 4,000, and preferably ranges from about 2000 to about 3000.

As will be readily appreciated by those skilled in the art, the low processing temperatures and large processing windows achieved by the inventive resins favorably impact upon process economics allowing for the use of conventional epoxy RTM equipment and avoiding the need for more expensive high temperature injection systems.

Particularly advantageous polyimide resins are provided when:

(a) the resin is prepared by reacting BPDA with a diamine selected from the group of BAPP, BAPP/SR, APB, TPE-R and 3,4-ODA, and end-capping any remaining amine groups with an unsaturated carbocyclic monomeric anhydride selected from the group of CA, HA and IA. For example, the following resins are contemplated by the present invention:
  (i) BPDA//BAPP//CA;
  (ii) BPDA//APB//CA;
  (iii) BPDA//BAPP/SR//CA;
  (iv) BPDA//APB//HA;
  (v) BPDA//BAPP//HA; and
  (vi) BPDA//BAPP/IA, (b) the resin is prepared by reacting BTDA with a diamine selected from the group of BAPS-M, BAPP/BAPS-M, m-PDA/BAPS-M, 3,4'-ODA/APB, APB and BAPP/SR, and end-capping any remaining amine groups with an unsaturated carbocyclic monomeric anhydride selected from the group of CA, HA and IA. For example, the following resins are contemplated by the present invention:
  (i) BTDA//BAPS-M//CA;
  (ii) BTDA//BAPP/BAPS-M//CA;
  (iii) BTDA//m-PDA/BAPS-M//CA;
  (iv) BTDA//3,4'-ODA/APB//CA;
  (v) BTDA//APB//CA;
  (vi) BTDA//BAPP/SR//CA;
  (vii) BTDA//BAPS-M//HA;
  (viii) BTDA//APB//HA; and
  (ix) BTDA//BAPS-M/IA, (c) the resin is prepared by reacting BTDA/BPDA with BAPP, and with CA to form BTDA/BPDA//BAPP//CA, (d) the resin is prepared by reacting PMDA with BAPS-M, and with CA to form PMDA//BAPS-M//CA, (e) the resin is prepared by reacting OPDA with a diamine selected from the group of BAPP and BAPS-M, and with CA to form OPDA//BAPP//CA and OPDA//BAPS-M//CA, and (f) the resin is prepared by reacting DSDA with a diamine selected from the group of BAPS-M and BAPP, and CA to form DSDA//BAPS-M//CA and DSDA//BAPP//CA.

The present invention also contemplates the provision of high temperature composites comprising reinforcing fibers embedded in polyimide resin matrices. The inventive composites demonstrate a combination of desirable properties after cure that render them suitable for use in a wide variety of applications such as aerospace, military, and infra-structure repair applications. More specifically, these high temperature composites exhibit a use temperature of greater than about 200° C., and further exhibit a $T_g$ of greater than about 240° C., toughness, microcrack resistance, solvent and moisture resistance, damage tolerance, and good retention of mechanical properties under hot/wet conditions.

Reinforcing fibers suitable for use in the inventive composite include carbon fibers, glass fibers, and quartz fibers.

The subject invention will now be described by reference to the following illustrative examples. The examples are not, however, intended to limit the generally broad scope of the present invention.

WORKING EXAMPLES

Preparation of RTM and RI Processable Polyimide Resins.

Unless otherwise stated, the procedures, conditions and molar ratios detailed below for the preparation of BPDA//BAPP//CA were also used to prepare the remaining RTM and RI processable polyimide resins in this WORKING EXAMPLES section.

1) BPDA//BAPP//CA

Synthesis of Amic Acid Solution.

BPDA (7.35 g, 0.025 mol) was placed in NMP (70 g) in a beaker, while BAPP (20.5 g, 0.05 mol) was placed in NMP (70 g) in a separate beaker. The beakers were heated to completely dissolve the monomers. The resulting solutions were cooled to room temperature, and the BAPP solution transferred into a 500 ml three-necked, round-bottom flask equipped with a mechanical stirrer, thermometer and dropping funnel for adding the BPDA solution. The beakers of BPDA and BAPP solutions were rinsed to remove all reactants by using an additional 5.0 g of NMP for each container. The BPDA solution was then added drop wise into the BAPP solution over a period of three hours. CA (5.6 g, 0.05 mol) end-capping agent was then added drop wise to the round-bottom flask over a period of about one hour. The resulting mixture, the temperature of which had increased slightly, was then stirred for one hour to form an amic acid solution having a solids content of 30% by wt. The addition of the BPDA solution and CA end-capping agent were performed at room temperature.

Synthesis of Imide Powder.

A quantity of 50 g of the amic acid solution and 116 g of toluene were placed in a 500 ml, three-necked, round-bottom flask fitted with a Dean-Stark trap full of toluene and connected to a reflux condenser, nitrogen inlet/outlet, and a temperature sensor connected through a temperature controller. A quantity of 0.3 g methane sulfonic acid catalyst was then added to the solution and the resulting mixture heated via an electronic heating mantle to reflux at 120 to 125° C. and held for three to four hours. Water generated during this process was collected at the bottom of the Dean-Stark trap. The reaction solution was then allowed to cool to room temperature. The reaction solution was then transferred to an evaporating flask of a rotational evaporator. Toluene was removed from the reaction solution using the rotational evaporator (vacuum—30 mbar, oil heating bath—120° C.). The solution remaining in the evaporating flask of the rotational evaporator was then transferred to a blender containing about one liter of tap water and mixed for five minutes to precipitate the solution. The resulting precipitate was isolated using vacuum filtration, washed twice with tap water and dried in a forced air oven at 105° C. overnight to give a quantitative yield (99.5%) of yellow powder.

The calculated number average molecular weight of the prepared polyimide resin was 1266 g/mole.

2) BTDA//BAPS-M//CA

Synthesis of Amic Acid Solution.
BTDA (8.05 g, 0.025 mol, NMP 70 g), BAPS-M (21.6 g, 0.05 mol, NMP 70 g), CA (5.60 g, 0.05 mol).

3) BTDA//BAPP/BAPS-M//CA

Synthesis of Amic Acid Solution.
BTDA (8.05 g, 0.025 mol, NMP 70 g), BAPP/BAPS-M (5.13 g, 0.0125 mol/16.3 g, 0.0375 mol, NMP 70 g), CA (5.6 g, 0.05 mol).

4) BTDA/BPDA//BAPP//CA

Synthesis of Amic Acid Solution.
BTDA/BPDA (2.0 g, 0.006 mol/5.5 g, 0.019 mol, NMP 70 g), BAPP (50.5 g, 0.05 mol, NMP 70 g), CA (5.6 g, 0.05 mol).

5) BTDA//m-PDA/BAPS-M//CA

Synthesis of Amic Acid Solution.
BTDA (8.05 g, 0.025 mol, NMP 70 g), m-PDA/BAPS-M (1.35 g, 0.0125 mol/16.3 g, 0.0375 mol, NMP 70 g), CA (5.6 g, 0.05 mol).

6) BTDA//3,4-ODA/APB//CA

Synthesis of Amic Acid Solution.
BTDA (8.05 g, 0.025 mol, NMP 70 g), 3,4-ODA/APB (2.5 g, 0.0125 mol/10.95 g, 0.0375 mol, NMP 70 g), CA (5.6 g, 0.05 mol).

7) BTDA//APB//CA

Synthesis of Amic Acid Solution.
BTDA (8.05 g, 0.025 mol, NMP 70 g), APB (14.6 g, 0.05 mol, NMP 70 g), CA (5.6 g, 0.05 mol).

8) BPDA//APB//CA

Synthesis of Amic Acid Solution.
BPDA (7.35 g, 0.025 mol, NMP 70 g), APB (14.6 g, 0.05 mol, NMP 70 g), CA (5.6 g, 0.05 mol).

9) BTDA//BAPP/SR//CA

Synthesis of Amic Acid Solution.
BTDA (8.05 g, 0.025 mol, NMP 70 g), BAPP/SR (18.45 g, 0.05 mol/2.05 g, NMP 70 g), CA (5.6 g, 0.05 mol).

10) BPDA//BAPP/SR//CA

Synthesis of Amic Acid Solution.
BPDA (7.35 g, 0.025 mol, NMP 70 g), BAPP/SR (16.4 g, 0.05 mol/4.1 g, NMP 70 g), CA (5.6 g, 0.05 mol).

11) BPDA//TPE-R//CA

Synthesis of Amic Acid Solution.
BPDA (7.35 g, 0.025 mol, NMP 70 g), TPE-R (14.7 g, 0.05 mol, NMP 70 g), CA (5.6 g, 0.05 mol).

12) BPDA//3,4-ODA//CA

Synthesis of Amic Acid Solution.
BPDA (7.35 g, 0.025 mol, NMP 70 g), 3,4-ODA (10 g, 0.05 mol, NMP 70 g), CA (5.6 g, 0.05 mol).

13) PMDA//BAPS-M//CA

Synthesis of Amic Acid Solution.
PMDA (5.45 g, 0.025 mol, NMP 70 g), BAPS-M (21.6 g, 0.05 mol, NMP 70 g), CA (5.6 g, 0.05 mol).

14) OPDA//BAPP//CA

Synthesis of Amic Acid Solution.
OPDA (7.75 g, 0.025 mol, NMP 70 g), BAPP (20.5 g, 0.05 mol, NMP 70 g), CA (5.6 g, 0.05 mol).

15) OPDA//BAPS-M//CA

Synthesis of Amic Acid Solution.
OPDA (7.75 g, 0.025 mol, NMP 70 g), BAPS-M (21.6 g, 0.05 mol, NMP 70 g), CA (5.6 g, 0.05 mol).

16) DSDA//BAPS-M//CA

Synthesis of Amic Acid Solution.
DSDA (8.95 g, 0.025 mol, NMP 70 g), BAPS-M (21.6 g, 0.05 mol, NMP 70 g), CA (5.6 g, 0.05 mol).

17) DSDA//BAPP//CA

Synthesis of Amic Acid Solution.
DSDA (8.95 g, 0.025 mol, NMP 70 g), BAPP (20.5 g, 0.05 mol, NMP 70 g), CA (5.6 g, 0.05 mol).

18) BTDA//BAPS-M//HA

Synthesis of Amic Acid Solution.
BTDA (8.05 g, 0.025 mol, NMP 70 g), BAPS-M (21.6 g, 0.05 mol, NMP 70 g), HA (8.2 g, 0.05 mol).

19) BTDA//APB//HA

Synthesis of Amic Acid Solution.
BTDA (8.05 g, 0.025 mol, NMP 70 g), APB (14.6 g, 0.05 mol, NMP 70 g), HA (8.2 g, 0.05 mol).

20) BPDA//APB//HA

Synthesis of Amic Acid Solution.
BPDA (7.35 g, 0.025 mol, NMP 70 g), APB (14.6 g, 0.05 mol, NMP 709), HA (8.2 g, 0.05 mol).

21) BPDA//BAPP//HA

Synthesis of Amic Acid Solution.

BPDA (7.35 g, 0.025 mol, NMP 70 g), BAPP (20.5 g, 0.05 mol, NMP 70 g), HA (8.2 g, 0.05 mol).

22) BPDA//BAPP//IA

Synthesis of Amic Acid Solution.

BPDA (7.35 g, 0.025 mol, NMP 70 g), BAPP (20.5 g, 0.05 mol, NMP 70 g), IA (5.6 g, 0.05 mol).

23) BTDA//BAPS-M//IA

Synthesis of Amic Acid Solution.

BTDA (7.35 g, 0.025 mol, NMP 70 g), BAPS-M (21.6 g, 0.05 mol, NMP 70 g), IA (5.6 g, 0.05 mol).

In Table 1 below, properties of the RTM and RI processable polyimide resins of the above examples are summarized.

TABLE 1

Properties of RTM and RI Processable Polyimide Resins

| Example | RTM and RI Processable Polyimide Resin | Molar Ratio | Melting Point (° C.) | Melt Viscosity (cps) |
|---|---|---|---|---|
| 1 | BPDA//BAPP//CA | 1:2:2 | 160/330 | 1,000 |
| 2 | BTDA//BAPS-M//CA | 1:2:2 | 160/320 | 1,000 |
| 3 | BTDA//BAPP/BAPS-M//CA | 1:2(25/75):2 | 190/330 | 1,000 |
| 4 | BTDA//BPDA//BAPP//CA | 1(25/75):2:2 | 160/330 | 1,000 |
| 5 | BTDA//m-PDA/BAPS-M//CA | 1:2(25/75):2 | 175/310 | 1,000 |
| 6 | BTDA//3,4ODA/APB//CA | 1:2(25/75):2 | 210/305 | 1,000 |
| 7 | BTDA//APB//CA | 1:2:2 | 140/335 | 1,000 |
| 8 | BPDA//APB//CA | 1:2:2 | 160/330 | 1,000 |
| 9 | BTDA//BAPP/SR//CA | 1:2(90/10 wt %):2 | 190/330 | 950 |
| 10 | BPDA//BAPP/SR//CA | 1:2(80/20 wt %):2 | 210/345 | 900 |
| 11 | BPDA//TPE-R//CA | 1:2:2 | 280/315 | 1,100 |
| 12 | BPDA//3,4ODA//CA | 1:2:2 | 280/310 | 1,000 |
| 13 | PMDA//BAPS-M//CA | 1:2:2 | 150/330 | 1,000 |
| 14 | OPDA//BAPP/CA | 1:2:2 | 160/330 | 1,000 |
| 15 | OPDA//BAPS-M//CA | 1:2:2 | 160/305 | 1,000 |
| 16 | DSDA//BAPS-M//CA | 1:2:2 | 160/320 | 1,000 |
| 17 | DSDA//BAPP//CA | 1:2:2 | 160/330 | 1,000 |
| 18 | BTDA//BAPS-M//HA | 1:2:2 | 200/285 | 1,000 |
| 19 | BTDA//APB//HA | 1:2:2 | 160/290 | 1,000 |
| 20 | BPDA//APB//HA | 1:2:2 | 140/305 | 1,000 |
| 21 | BPDA//BAPP//HA | 1:2:2 | 200/290 | 1,000 |
| 22 | BPDA//BAPP/HA | 1:2:2 | 180/250 | 1,200 |
| 23 | BTDA//BAPS-M//IA | 1:2:2 | 190/260 | 1,000 |

Examples 1 to 5, 7 to 9, 13 to 17, 19, 20, 22 and 23, demonstrate that polyimide resins prepared in accordance with the teachings of the present invention exhibit melting at temperatures of less than about 200° C. and melt viscosities at 200° C. of less than about 3000 cps, rendering them suitable for processing by RTM and RI methods at reduced processing temperatures of less than about 200° C. While Examples 6, 10, 18 and 21 exhibited melting at slightly higher temperatures, the melting points of these resins may be reduced by adjusting the weight percents of the diamines in Examples 6, 18 and 21 and by adjusting the weight percents of the diamine and rubber components in Example 10. (See, e.g., Examples 9 and 10).

Preparation and Testing of Carbon Fabric Reinforced Composite.

1) Preparation of BPDA//BAPP//CA Matrix Resin.

Synthesis of Amic Acid Solution.

BPDA (150.52 g, 0.512 mol) was placed in NMP (1200 g) in a beaker, while BAPP (419.84 g, 1.024 mol) was placed in NMP (400 g) in a separate beaker. The beakers were heated to completely dissolve the monomers. The resulting solutions were cooled to room temperature, and the BAPP solution transferred into a 10,000 ml three-necked, round-bottom flask equipped with a mechanical stirrer, thermometer and dropping funnel for adding the BPDA solution. The beakers of BPDA and BAPP solutions were rinsed to remove all reactants by using an additional 10 g of NMP for each container. The BPDA solution was then added drop wise into the BAPP solution over a period of three hours. CA (126.15 g, 1.126 mol) end-capping agent was then added drop wise to the round-bottom flask over a period of about one hour. The resulting mixture, the temperature of which had increased slightly, was then stirred for one hour to form an amic acid solution. The addition of the BPDA solution and CA end-capping agent were performed at room temperature.

Synthesis of Imide Powder.

A quantity of 2316.5 g of the amic acid solution and 5,144 g of toluene were placed in a 10 liter, three-necked, round-bottom flask fitted with a Dean-Stark trap full of toluene and connected to a reflux condenser, nitrogen inlet/outlet, and a temperature sensor connected through a temperature controller. A quantity of 10 g methane sulfonic acid catalyst was then added to the solution and the resulting mixture heated via an electronic heating mantle to reflux at 120 to 125° C. and held for three to four hours. Water generated during this process was collected at the bottom of the Dean-Stark trap. The reaction solution was then allowed to cool to room temperature. The reaction solution was then transferred to an evaporating flask of a rotational evaporator. Toluene was removed from the reaction solution using the rotational evaporator (vacuum—30 mbar, oil heating bath—120° C.). The solution remaining in the evaporating flask of the rotational evaporator was then transferred to a blender containing about 30 liters of tap water and mixed for 5 minutes to precipitate the solution. The resulting precipitate was isolated using vacuum filtration, washed twice with tap water and dried in a forced air oven at 60° C. for five hours and then at 105° C. for ten hours to give a quantitative yield (99.5%) of yellow powder.

The calculated number average molecular weight of the prepared polyimide resin was 1266 g/mole.

2) Preparation of Carbon Fabric Reinforced Composite.

A resin transfer molding or RTM apparatus was used to prepare a carbon fabric reinforced composite in accordance with the present invention. The RTM apparatus included a mold having at least one surface configured to the shape of the part to be made. The mold, which measured 25.4 centimeters by 45.7 centimeters, was enclosed and had an upper and a lower part, and a seal for providing an airtight seal between the mold components during use. The mold further included resin injection and evacuation ports for providing entrance and exit points, respectively, for the matrix resin.

Eight layers of woven carbon fabric obtained from Textile Products, Inc., 2512 Woodland Drive, Anaheim, Calif. 92801, under the product designation T650/35-3k-8hs carbon fabric, were placed one on top of the other in the mold, with warp fibers all running in the same direction. The mold was then sealed and air drawn from the mold to achieve a vacuum of 70 pascals. The prepared polyimide resin was then melted at 200° C., degassed and pumped into the mold at a pressure of 2.4 megapascals through the resin injection port, which was maintained at a temperature of about 200° C.

After the mold was full, trapped air was removed and the mold isolated using appropriate valving. The mold was then heated to a temperature of from 330 to 340° C. and maintained at that temperature for a period of four (4) hours. The mold was then cooled to room temperature, opened, and the cured carbon fabric reinforced composite removed.

The cured composite was then tested for short beam shear strength, flexural strength and modulus, and compression strength and modulus in accordance with the test methods described in ASTM D2344, ASTM D790, and ASTM D6641, respectively. The test results are shown in Table 2, below.

TABLE 2

| Property | Carbon Fabric Reinforced Composite |
|---|---|
| Short Beam Shear (ASTM D2344) | |
| at room temperature, MPa | 24.5 |
| at 200° C., MPa | 20.6 |
| Flexural Strength (ASTM D790) | |
| at room temperature, MPa | 420 |
| Flexural Modulus (ASTM D790) | |
| at room temperature, GPa | 45.7 |
| Compression Strength (ASTM D6641) | |
| at room temperature, MPa | 360 |
| Compression Modulus (ASTM D6641) | |
| at room temperature, GPa | 55.7 |

As shown above and in Table 2, carbon fabric reinforced composites employing the RTM and RI processable polyimide resins of the present invention may be prepared by RTM methods at reduced processing temperatures, and exhibit good mechanical properties rendering them suitable for use in a variety of structural and non-structural applications.

While various embodiments of the present invention have been described above, it should be understood that they have been presented by way of example only, and not limitation. Thus, the breadth and scope of the present invention should not be limited by any of the exemplary embodiments.

What is claimed is:

1. A polyimide resin for processing by resin transfer molding and resin infusion methods, wherein the resin is a reaction product of components of the group consisting of one or more aromatic dianhydrides, one or more aromatic diamines, at least one diamine having one or more oxygen linkages in its chemical structure, and one or more endcapping agents, and exhibits melting at temperatures of less than about 200° C. and stable melt viscosities at 200° C. of less than about 3000 centipoise, wherein fluctuation of the melt viscosity of the resin at 200° C. does not exceed 100 centipoise over a period of at least one hour.

2. The polyimide resin of claim 1, wherein the aromatic dianhydrides(s) has more than one aromatic ring in its chemical structure.

3. The polyimide resin of claim 2, wherein the aromatic dianhydride(s) is represented by the following formula (I)

(I)

or by the following general formula (II)

(II)

wherein, Z represents —CO—, —O—, —SO$_2$—, or a direct bond.

4. The polyimide resin of claim 3, wherein the aromatic dianhydride(s) is represented by formula (I) and comprises 1,2,4,5-benzenetetracarboxylic dianhydride.

5. The polyimide resin of claim 3, wherein the aromatic dianhydride(s) is represented by formula (II) and is selected from the group including 3,3'4,4'-biphenyltetracarboxylic dianhydride, 1,1',2,2'-benzophenone tetracarboxylic dianhydride, 4,4'-oxydiphthalic anhydride, 3,3',4,4'-diphenylsulfone tetracarboxylic diandydride, and mixtures thereof.

6. The polyimide resin of claim 1, wherein the resin is a reaction product of two aromatic dianhydrides, one or more aromatic diamines, and one or more endcapping agents, wherein a first dianhydride is present in an amount ranging from about 5 to about 40% by wt., based on the total weight of the dianhydrides, and wherein a second dianhydride is present in an amount ranging from about 95 to about 60% by wt., based on the total weight of the dianhydrides.

7. The polyimide resin of claim 1, wherein the aromatic diamine(s) is selected from the group of 3,4'-oxydianiline, m-phenylenediamine, 2,2'-bis[4-(4-aminophenoxy)phenyl] propane, bis[4-(3-aminophenoxy)phenyl]sulfone, 1,3-bis(3-aminophenoxy)benzene, 1,3-bis(4-aminophenoxy)benzene, and mixtures thereof.

8. The polyimide resin of claim 1, wherein the resin is a reaction product of one or more aromatic dianhydrides, two aromatic diamines, and one or more endcapping agents, and wherein at least one diamine has one or more oxygen linkages in its chemical structure and is present in an amount of at least 50% by wt., based on the total weight of the diamines.

9. The polyimide resin of claim 1, wherein the endcapping agents are unsaturated carbocyclic monomeric anhydrides that form oligomers that exhibit melting at temperatures of less than about 250° C., and that have melt viscosities at 200° C. ranging from about 500 to about 3000 centipose.

10. The polyimide resin of claim 9, wherein the endcapping agents are selected from the group including nadic anhydride (5-norbornene-2,3-dicarboxylic anhydride), alkyl derivatives of maleic anhydride, 2-octen-1-ylsuccinic anhydride, and mixtures thereof.

11. A method for producing a polyimide resin for processing by resin transfer molding and resin infusion methods, wherein the resin exhibits melting at temperatures of less than about 200° C. and stable melt viscosities at 200° C. of less than about 3000 centipoise, wherein fluctuation of the melt viscosity of the resin at 200° C. does not exceed 100 centipoise over a period of at least one hour, and wherein the method comprises:

(a) chemically combining:
  i. one or more aromatic dianhydrides represented by the following formula (I)

or by the following general formula (II)

wherein, Z represents —CO—, —O—, —SO₂—, or a direct bond, ii. one or more aromatic diamines selected from the group of 3,4'-oxydianiline, m-phenylenediamine, 2,2'-bis[4-(4-aminophenoxy)phenyl]propane, bis[4-(3-aminophenoxy)phenyl]sulfone, 1,3-bis(3-aminophenoxy)benzene, and 1,3-bis(4-aminophenoxy)benzene, and iii. one or more carbocyclic monomeric anhydride end-capping agents selected from the group of nadic anhydride, alkyl derivatives of maleic anhydride, and 2-octen-1-ylsuccinic anhydride, and

(b) imidizing the chemical combination.

12. The method of claim 11, wherein the aromatic dianhydride(s) is represented by formula (I) and comprises 1,2,4,5-benzenetetracarboxylic dianhydride.

13. The method of claim 11, wherein the aromatic dianhydride(s) is represented by formula (II) and is selected from the group including 3,3',4,4'-biphenyltetracarboxylic dianhydride, 1,1,2,2'-benzophenone tetracarboxylic dianhydride, 4,4'-oxydiphthalic anhydride, 3,3',4,4'-diphenylsulfone tetracarboxylic diandydride, and mixtures thereof.

14. A polyimide resin for processing by resin transfer molding and resin infusion methods, wherein the resin exhibits melting at temperatures of less than about 200° C. and stable melt viscosities at 200° C. of less than about 3000 centipoise, wherein fluctuation of the melt viscosity of the resin at 200° C. does not exceed 100 centipoise over a period of at least one hour, and wherein the resin is produced by a method comprising:

(a) chemically combining:
  i. one or more aromatic dianhydrides represented by the following formula (I)

or by the following general formula (II)

wherein, Z represents —CO—, —O—, —SO₂—, or a direct bond, ii. one or more aromatic diamines selected from the group of 3,4'-oxydianiline, m-phenylenediamine, 2,2'-bis[4-(4-aminophenoxy)phenyl]propane, bis[4-(3-aminophenoxy)phenyl]sulfone, 1,3-bis(3-aminophenoxy)benzene, and 1,3-bis(4-aminophenoxy)benzene, and iii. one or more carbocyclic monomeric anhydride end-capping agents selected from the group of nadic anhydride, alkyl derivatives of maleic anhydride, and 2-octen-1-ylsuccinic anhydride, and (b) imidizing the chemical combination.

15. A high temperature composite comprising reinforcing fibers embedded in a polyimide resin matrix prepared using resin transfer molding or resin infusion methods, wherein the resin is a reaction product of one or more aromatic dianhydrides, one or more aromatic diamines, and one or more endcapping agents, and exhibits melting at temperatures of less than about 200° C. and a stable melt viscosity at 200° C. of less than about 3000 centipoise, wherein fluctuation of the melt viscosity of the resin at 200° C. does not exceed 100 centipoise over a period of at least one hour, and wherein the high temperature composite exhibits a use temperature of greater than about 200° C.

16. The high temperature composite of claim 15, wherein the one or more aromatic dianhydrides has more than one aromatic ring in its chemical structure.

17. The high temperature composite of claim 16, wherein the aromatic dianhydride(s) is represented by the following formula (I)

or by the following general formula (II)

wherein, Z represents —CO—, —O—, —SO$_2$—, or a direct bond.

18. The high temperature composite of claim 17, wherein the aromatic dianhydride(s) is represented by formula (I) and comprises 1,2,4,5-benzenetetracarboxylic dianhydride.

19. The high temperature composite of claim 17, wherein the aromatic dianhydride(s) is represented by formula (II) and is selected from the group including 3,3',4,4'-biphenyltetracarboxylic dianhydride, 1,1',2,2'-benzophenone tetracarboxylic dianhydride, 4,4'-oxydiphthalic anhydride, 3,3',4,4'-diphenylsulfone tetracarboxylic diandydride, and mixtures thereof.

20. The high temperature composite of claim 15, wherein the aromatic diamine(s) has at least one ether linkage in its chemical structure.

21. The high temperature composite of claim 20, wherein the aromatic diamine(s) is selected from the group of 3,4'-oxydianiline, m-phenylenediamine, 2,2'-bis[4-(4-aminophenoxy)phenyl]propane, bis[4-(3-aminophenoxy)phenyl]sulfone, 1,3-bis(3-aminophenoxy)benzene, 1,3-bis(4-aminophenoxy)benzene, and mixtures thereof.

22. The high temperature composite of claim 15, wherein the aromatic diamine(s) is used in combination with a rubber component.

23. The high temperature composite of claim 22, wherein the rubber component is an amine terminated rubber.

24. The high temperature composite of claim 15, wherein the end-capping agents are unsaturated carbocyclic monomeric anhydrides that form oligomers that exhibit melting at temperatures of less than about 250° C., and that have melt viscosities at 200° C. ranging from about 500 to about 3000 centipose.

25. The high temperature composite of claim 24, wherein the end-capping agents are selected from the group including nadic anhydride (5-norbornene-2,3-dicarboxylic anhydride), alkyl derivatives of maleic anhydride, 2-octen-1-ylsuccinic anhydride, and mixtures thereof.

26. A fiber-reinforced composite comprising reinforcing fibers embedded in a polyimide resin matrix prepared using resin transfer molding or resin infusion methods, wherein the resin is a reaction product of components selected from the group consisting of one or more aromatic dianhydrides, one or more aromatic diamines, and one or more endcapping agents, and exhibits melting at temperatures of less than about 200° C. and a stable melt viscosity at 200° C. of less than about 3000 centipoise, wherein fluctuation of the melt viscosity of the resin at 200° C. does not exceed 100 centipoise over a period of at least one hour.

27. A method of using a polyimide resin to prepare a fiber-reinforced composite by either resin transfer molding or resin infusion methods, wherein the fiber-reinforced composite material comprises reinforcing fibers embedded in a polyimide resin matrix, wherein the polyimide resin is a reaction product of one or more aromatic dianhydrides, one or more aromatic diamines, and one or more endcapping agents, and exhibits melting at temperatures of less than about 200° C. and stable melt viscosities at 200° C. of less than about 3000 centipoise, wherein fluctuation of the melt viscosity of the resin at 200° C. does not exceed 100 centipoise over a period of at least one hour, wherein the method comprises using the polyimide resin to prepare the polyimide resin matrix of the fiber-reinforced composite.

28. A polyimide resin for processing by resin transfer molding and resin infusion methods, wherein the resin is a reaction product of: one or more aromatic dianhydrides; one or more aromatic diamines, at least one diamine having one or more oxygen linkages in its chemical structure; and one or more endcapping agents comprising unsaturated carbocyclic monomeric anhydrides that form oligomers that exhibit melting at temperatures of less than about 250° C., and have melt viscosities at 200° C. ranging from about 500 to about 3000 centipoise.

29. The polyimide resin of claim 28, wherein the unsaturated carbocyclic monomeric anhydride endcapping agents are selected from the group consisting of nadic anhydride (5-norbornene-2,3-dicarboxylic anhydride), alkyl derivatives of maleic anhydride, 2-octen-1-ylsuccinic anhydride, and mixtures thereof.

30. A fiber-reinforced composite comprising reinforcing fibers embedded in a polyimide resin matrix prepared using resin transfer molding or resin infusion methods, wherein the resin is a reaction product of: one or more aromatic dianhydrides; one or more aromatic diamines, at least one diamine having one or more oxygen linkages in its chemical structure; and one or more endcapping agents comprising unsaturated carbocyclic monomeric anhydrides that form oligomers that exhibit melting at temperatures of less than about 250° C., and have melt viscosities at 200° C. ranging from about 500 to about 3000 centipoise.

31. The fiber-reinforced composite of claim 30, wherein the unsaturated carbocyclic monomeric anhydride endcapping agents are selected from the group consisting of nadic anhydride (5-norbornene-2,3-dicarboxylic anhydride), alkyl derivatives of maleic anhydride, 2-octen-1-ylsuccinic anhydride, and mixtures thereof.

* * * * *

UNITED STATES PATENT AND TRADEMARK OFFICE
CERTIFICATE OF CORRECTION

| | | |
|---|---|---|
| PATENT NO. | : 7,129,318 B2 | Page 1 of 1 |
| APPLICATION NO. | : 10/931070 | |
| DATED | : October 31, 2006 | |
| INVENTOR(S) | : Gary L. Deets et al. | |

It is certified that error appears in the above-identified patent and that said Letters Patent is hereby corrected as shown below:

Column 10, line 67 of the Patent, change "709)," to --70g),--.

Column 11, line 45, example 22 in Table 1 of the Patent, change "BPDA/BAPP/HA" to --BPDA//BAPP/IA--.

Signed and Sealed this

Twenty-third Day of January, 2007

JON W. DUDAS
*Director of the United States Patent and Trademark Office*